US009678681B2

(12) United States Patent
Goldberg et al.

(10) Patent No.: US 9,678,681 B2
(45) Date of Patent: Jun. 13, 2017

(54) SECURED MULTI-TENANCY DATA IN CLOUD-BASED STORAGE ENVIRONMENTS

(71) Applicant: International Business Machines Corporation, Armonk, NY (US)

(72) Inventors: Itzhack Goldberg, Hadera (IL); Henry Z. Liu, Tucson, AZ (US); Erik Rueger, Ockenheim (DE); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/741,991

(22) Filed: Jun. 17, 2015

(65) Prior Publication Data
US 2016/0371021 A1    Dec. 22, 2016

(51) Int. Cl.
*G06F 12/0815* (2016.01)
*G06F 12/0866* (2016.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0631* (2013.01); *G06F 3/0652* (2013.01)

(58) Field of Classification Search
CPC .................. G06F 12/0815; G06F 12/0866
USPC ........................................................ 711/162
See application file for complete search history.

(56) References Cited

U.S. PATENT DOCUMENTS

| | | | |
|---|---|---|---|
| 6,578,108 B1 * | 6/2003 | Fujimoto | G06F 3/0607 711/114 |
| 7,020,758 B2 * | 3/2006 | Fisk | H04L 41/08 711/114 |
| 7,231,409 B1 * | 6/2007 | Chen | G06F 11/1435 |
| 7,398,418 B2 * | 7/2008 | Soran | G06F 3/0608 711/114 |
| 7,454,566 B1 * | 11/2008 | Overby | G06F 3/0607 711/100 |
| 7,464,199 B2 * | 12/2008 | Bissessur | G06F 13/28 710/22 |
| 7,882,307 B1 * | 2/2011 | Wentzlaff | G06F 12/0813 711/119 |

(Continued)

OTHER PUBLICATIONS

"Block suballocation", http://en.wikipedia.org/wiki/Block_suballocation, Accessed from the Internet on Apr. 23, 2015, 3 pages.

(Continued)

*Primary Examiner* — Yong Choe
*Assistant Examiner* — Mohamed Gebril
(74) *Attorney, Agent, or Firm* — Francis Lammes; Stephen J. Walder, Jr.; Randall J. Bluestone

(57) ABSTRACT

A mechanism is provided for multi-tenancy data security. A storage device receives a request for storage from a client device. Responsive to the request for storage being from an existing tenant, the storage device determines whether there is allocated unused storage in a freed space storage pool associated with the existing tenant. Responsive to the allocated unused storage existing in the freed space storage pool, the storage device re-allocates all or a portion of the allocated unused storage existing in the freed space storage pool to an active storage pool associated with the existing tenant in order to satisfy the request such that the client device accesses the allocated unused storage in the active storage pool.

18 Claims, 8 Drawing Sheets

(56) References Cited

U.S. PATENT DOCUMENTS

| | | | | |
|---|---|---|---|---|
| 7,971,025 | B2* | 6/2011 | Murase | G06F 3/0607 711/161 |
| 8,332,594 | B2* | 12/2012 | Borntraeger | G06F 12/109 711/147 |
| 8,458,717 | B1 | 6/2013 | Keagy et al. | |
| 8,499,114 | B1* | 7/2013 | Vincent | G06F 9/5077 711/147 |
| 8,631,205 | B1* | 1/2014 | Wentzlaff | G06F 12/0813 710/10 |
| 8,832,459 | B2 | 9/2014 | DeHaan | |
| 8,909,845 | B1* | 12/2014 | Sobel | G06F 9/45558 711/154 |
| 8,996,837 | B1* | 3/2015 | Bono | G06F 3/0614 711/114 |
| 9,280,469 | B1* | 3/2016 | Kuang | G06F 12/0815 |
| 2005/0268067 | A1* | 12/2005 | Lee | G06F 12/10 711/202 |
| 2006/0047908 | A1* | 3/2006 | Chikusa | G06F 3/0613 711/114 |
| 2007/0156951 | A1* | 7/2007 | Sultan | G06F 11/1044 711/103 |
| 2008/0010419 | A1* | 1/2008 | Kao | G06F 13/1694 711/154 |
| 2008/0010420 | A1* | 1/2008 | Kao | G06F 12/0223 711/154 |
| 2008/0010500 | A1* | 1/2008 | Shimmitsu | G06F 11/1662 714/6.32 |
| 2008/0229045 | A1* | 9/2008 | Qi | G06F 3/0605 711/170 |
| 2008/0263299 | A1* | 10/2008 | Suzuki | G06F 11/1662 711/162 |
| 2009/0049264 | A1* | 2/2009 | Resnick | G06F 12/0844 711/163 |
| 2009/0204872 | A1* | 8/2009 | Yu | G06F 3/0613 714/773 |
| 2009/0240880 | A1* | 9/2009 | Kawaguchi | G06F 3/0617 711/114 |
| 2010/0169401 | A1* | 7/2010 | Gopal | G06F 7/02 708/316 |
| 2010/0281208 | A1* | 11/2010 | Yang | G06F 3/0611 711/103 |
| 2010/0306174 | A1* | 12/2010 | Otani | G06F 11/1464 707/640 |
| 2011/0185120 | A1* | 7/2011 | Jess | G06F 3/061 711/114 |
| 2012/0110592 | A1* | 5/2012 | Shah | G06F 9/5077 718/104 |
| 2012/0311291 | A1 | 12/2012 | Fiske et al. | |
| 2013/0124807 | A1* | 5/2013 | Nielsen | G06F 11/1438 711/162 |
| 2013/0268740 | A1 | 10/2013 | Holt | |
| 2014/0115709 | A1 | 4/2014 | Gross et al. | |

OTHER PUBLICATIONS

"Data Shredder", https://en.wikipedia.org/wiki/Data_Shredder, Accessed from the Internet on Apr. 30, 2015, 2 pages.

"MultiStore", NetApp, http://www.netapp.com/us/products/storage-systems/multistore.aspx, Accessed from the Internet on Apr. 23, 2015, 2 pages.

Cachin, Christian et al., "Policy-based Secure Deletion", IBM Research—Zurich, CH-8803 Ruschlikon, Switzerland, Aug. 26, 2013, 25 pages.

Disclosed Anonymously, "Leakage Resilent Could Storage", An IP.com Prior Art Database Technical Disclosure, 000211368, Sep. 29, 2011, 6 pages.

Disclosed Anonymously, "Method and System for Secured Block Allocation in a Multi-Tenancy Storage Cloud Environment", An IP.com Prior Art Database Technical Disclosure, 000206163, Apr. 15, 2011, 6 pages.

Disclosed Anonymously, "Smarter Erasure in Storage Cloud", An IP.com Prior Art Database Technical Disclosure, 000221589, Sep. 13, 2012, 5 pages.

Feresten, Paul, "Storage Multi-Tenancy for Cloud Computing", SNIA Cloud Storage Initiative, 2010 Storage Networking Industry Association, Mar. 2010, 14 pages.

* cited by examiner

SECURED MULTI-TENANCY DATA IN CLOUD-BASED STORAGE ENVIRONMENTS

BACKGROUND

The present application relates generally to an improved data processing apparatus and method and more specifically to mechanisms for securing multi-tenancy data in cloud-based storage environments.

The ever growing popularity of cloud storage implies that cloud-based storage service providers may need to sell/lease storage space to multiple tenants and then manage their respective storage needs while sharing the same physical storage devices. The tenants may be competitors and hence, the cloud-based storage service provider has to ensure data segregation so that each client may use and see only their respective data. However, the most advanced storage devices are based on grid technology where all data of all Logical Unit Numbers (LUNs) is spread across all disks/Flash components to allow for optimal Input/Output (I/O) parallelism and an inherit hot-spot free and hands-free work load balancing. To make things even more challenging, todays' storage devices are thin-provisioned so that space is allocated only when the space is needed and not reserved up-front.

SUMMARY

In one illustrative embodiment, a method, in a data processing system, is provided for multi-tenancy data security. The illustrative embodiment receives, in a storage device, a request for storage from a client device. The illustrative embodiment determines, by the storage device, whether there is allocated unused storage in a freed space storage pool associated with the existing tenant in response to the request for storage being from an existing tenant. The illustrative embodiment re-allocates all or a portion of the allocated unused storage existing in the freed space storage pool to an active storage pool associated with the existing tenant in order to satisfy the request such that the client device accesses the allocated unused storage in the active storage pool in response to the allocated unused storage existing in the freed space storage pool.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
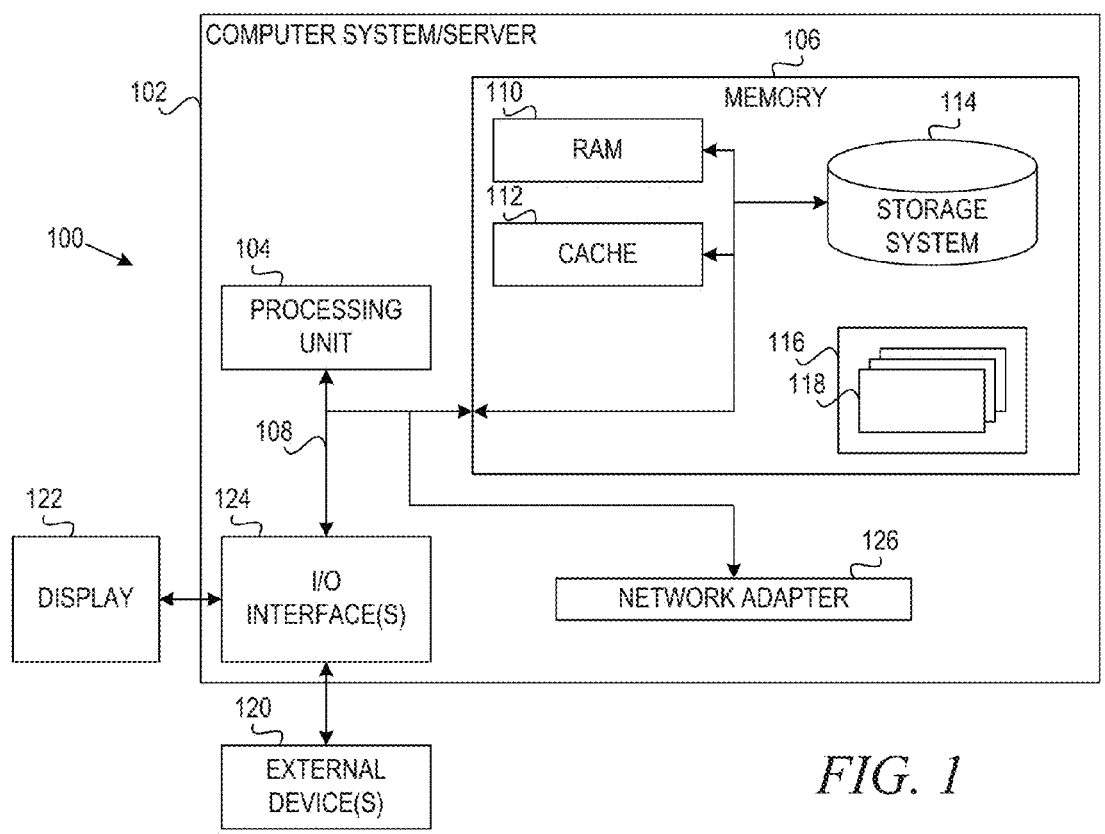
FIG. 1 depicts a cloud computing node according to an illustrative embodiment.

In cloud-based storage environments, unused/free space (often associated with deleted snapshots, which are point-in-time images of the respective Logical Unit Numbers (LUNs)), is recycled and reassigned to other LUNs which may belong to another domain/client. In cloud-based storage environments on legacy Redundant Array of Independent Disks (RAID) storage devices, which consist of a rather small number of disks/Flash/elements, certain storage arrays may be dedicated to their respective clients and, in doing so, ensure the physical separation of data and its security. Grid-based storage arrays (GRID), which consist of hundreds of disks/Flash components, cannot be separated into per client silos because, if such a separation were performed, the disks/Flash components will no longer operate as the grid-based storage arrays as originally designed.

For some cloud-based storage environments, a multi-tenant function is not geared toward security and is considered to be just an administrative set of tools to ease the management of multi-tenant environment. Thus, there is a need to facilitate data segregation for multiple tenants and ensure that under no circumstances will their data security be compromised and be accessible by another tenant who may be hosted on the very same cloud-based storage device. Yet, the data segregation cannot break the GRID nature and the distribution of data across all disks. Thus, the illustrative embodiments retain the storage system design point of spreading data across all of its disks/Flash and ensure that, under no circumstances, can one client's data be seen/compromised by others. That is, the mechanisms of the illustrative embodiments segregate data so that each tenant may use their own portion of the storage device, while that portion of the storage device cannot be shared with others while retaining the GRID design points.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2:
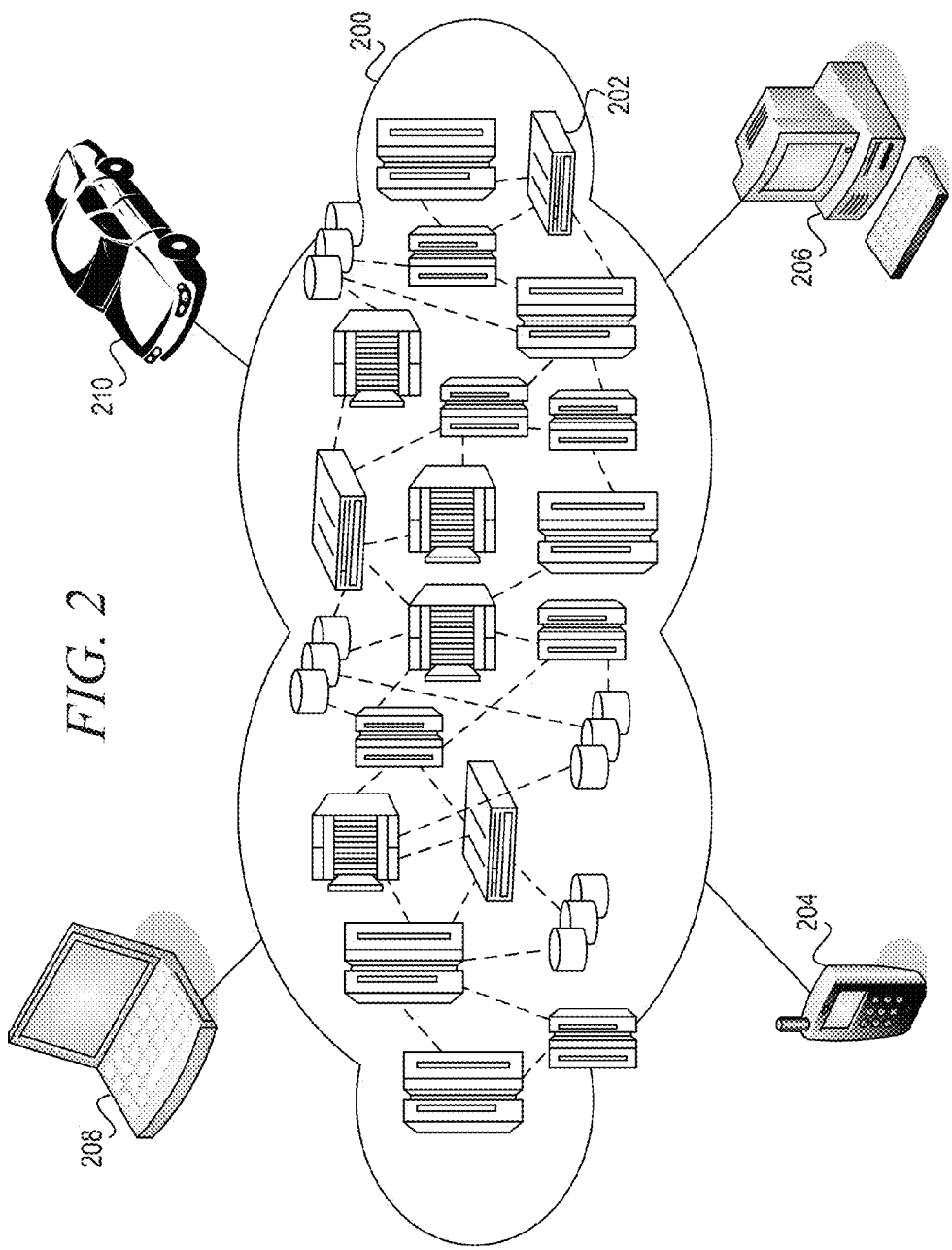
FIG. 2 depicts a cloud computing environment according to an illustrative embodiment.

Referring now to FIG. 2, illustrative cloud computing environment 200 is depicted. As shown, cloud computing environment 200 comprises one or more cloud computing nodes 202, such as computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser).

Figure 3:
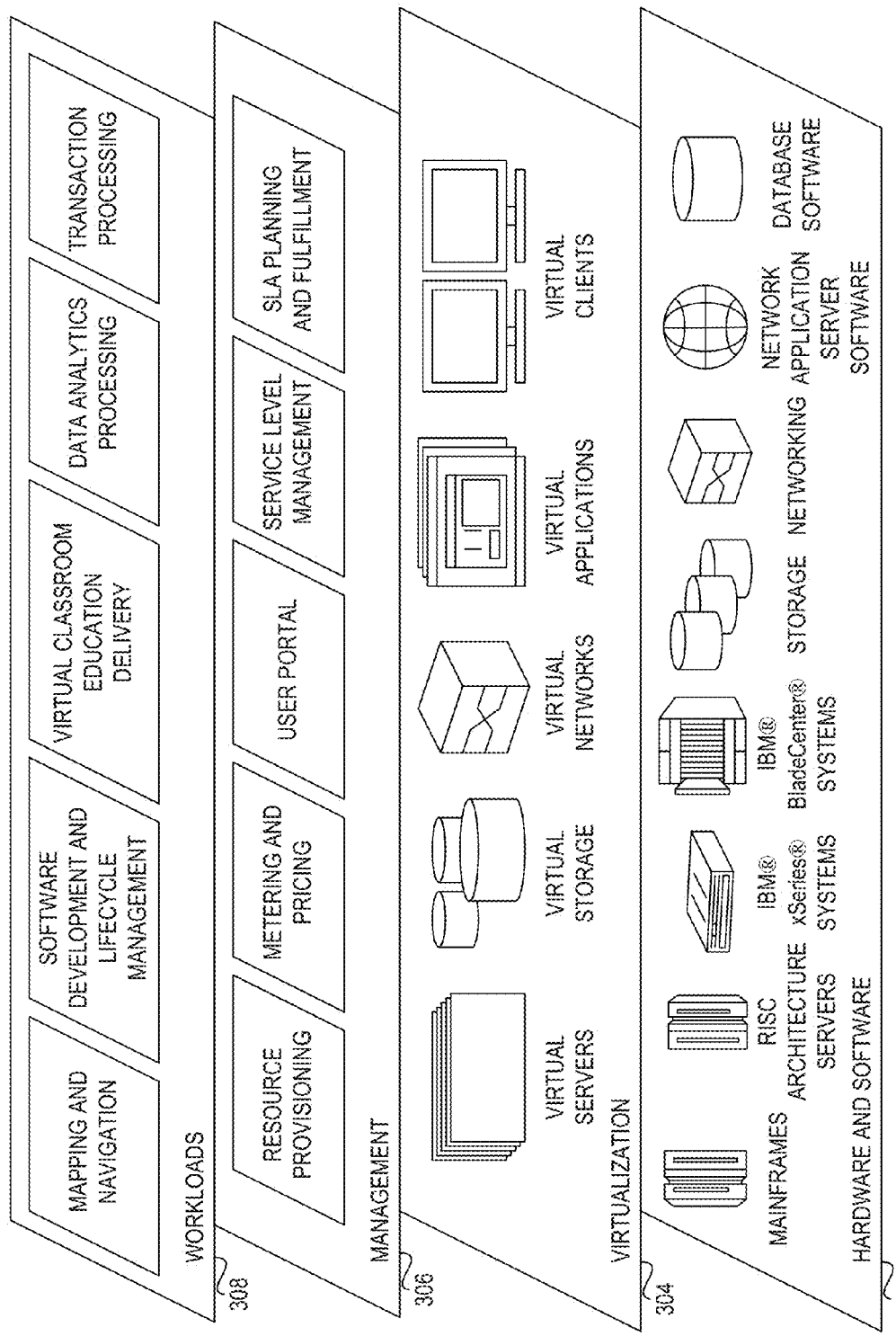
FIG. 3 depicts abstraction model layers according to an illustrative embodiment.

Referring now to FIG. 3, a set of functional abstraction layers provided by cloud computing environment 200 of FIG. 2 are shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM@® zSeries® systems; RISC (Reduced Instruction Set Computer) architecture based servers, in one example IBM pSeries® systems; IBM xSeries® systems; IBM BladeCenter systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
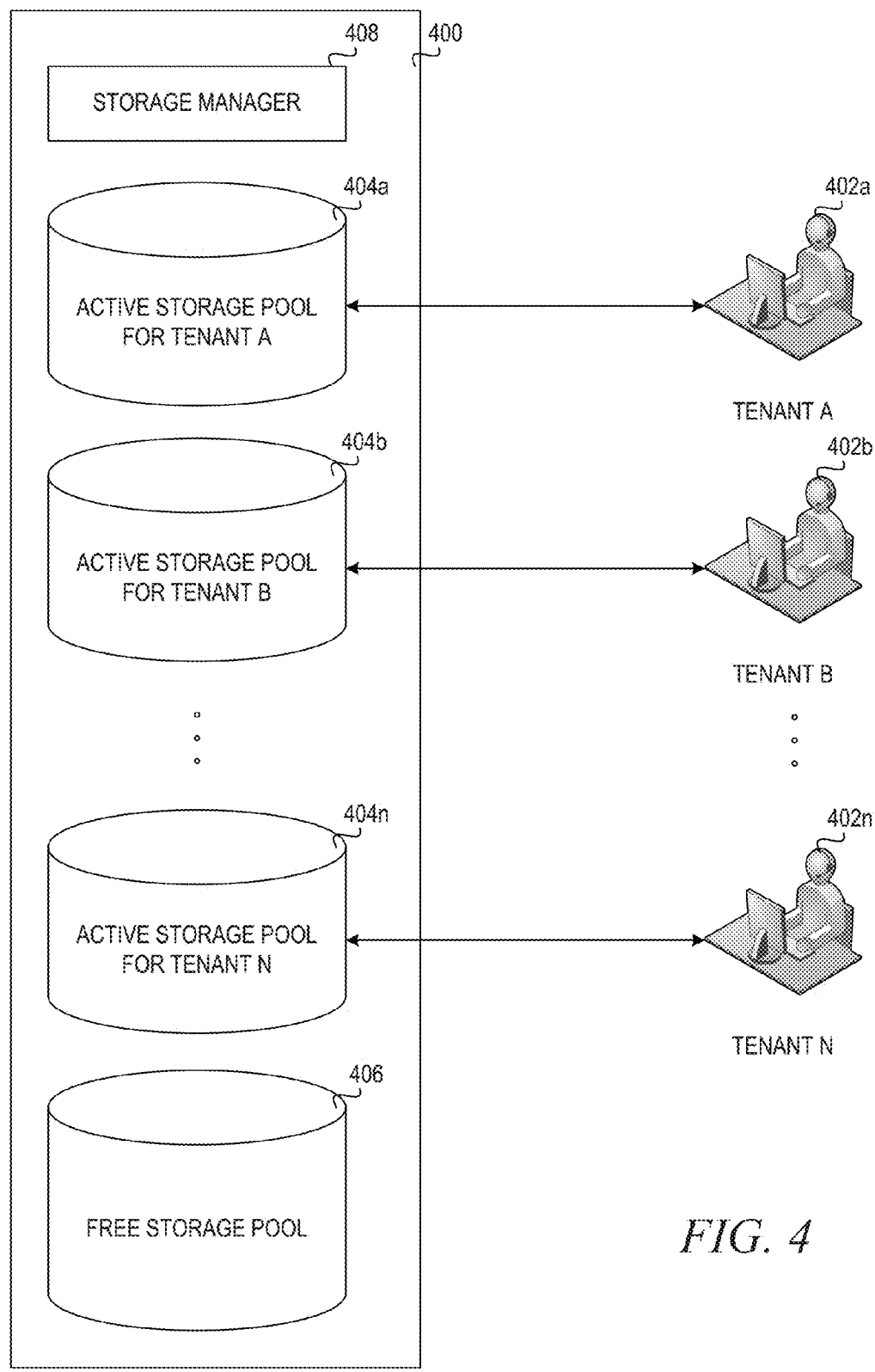
FIG. 4 depicts an exemplary storage server within a cloud computing environment that provides storage to a plurality of tenants in accordance with an illustrative embodiment.

In accordance with the illustrative embodiments, the storage device(s) within the cloud computing environment such as cloud computing environment 200 of FIG. 2 may have a set of logical unit number (LUNs) assigned to each of the tenants that the storage device supports. FIG. 4 depicts an exemplary storage server within a cloud computing environment that provides storage to a plurality of tenants in accordance with an illustrative embodiment. As is depicted, each tenant or domain in the set of tenants/domains 402a-402n has a set of assigned LUNs that forms an associated active storage pool 404a-404n within storage device 400. In addition, storage device 400 has a set of unused of free space that forms a free storage pool 406. When one or more of tenants/domains 402a-402n require additional storage space, storage manager 408 assigns one or more additional LUNs to the requesting tenant from free storage pool 406. When one or more of tenants/domain 402a-402n no longer require the additional storage space, the unused storage space is recycled and reassigned back to the free storage pool 406. However, recycling the unused storage space requires that the data be erased, scrubbed, shredded, or the like in order to return the unused storage space to the free storage pool 406 and the processing resources required to perform such erasing, scrubbing, shredding, or the like, is intensive and takes a toll in terms of processing resources and processing cycles on the cloud-based storage system. That is, returned unused storage to the free storage pool 406 requires that the data in the unused storage space to be overwritten multiple times (mostly eight times) with random data rubbish or zeros "0."

Figure 5:
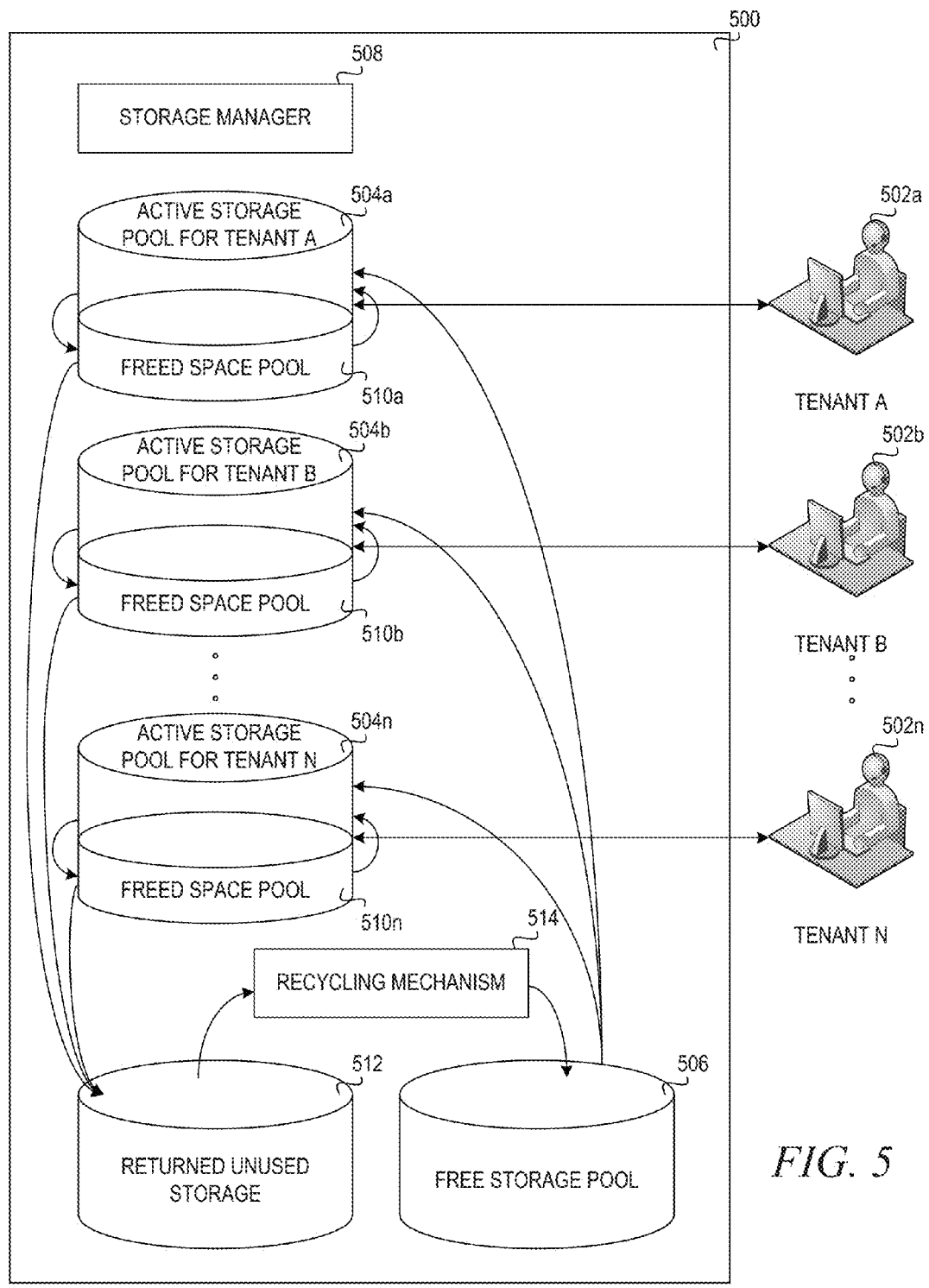
FIG. 5 depicts an exemplary multi-tenancy data security mechanism in accordance with the illustrative embodiments.

Thus, the illustrative embodiments provide mechanisms that secure multi-tenancy data in cloud-based storage environments through the reuse of unused storage space which reduces the recycling of unused storage space and thereby the processing resources and processing cycles required to return unused storage space to a free storage pool. FIG. 5 depicts an exemplary multi-tenancy data security mechanism in accordance with the illustrative embodiments. Initially, in storage device 500, all of storage device 500 is considered pristine as storage device 500 contains no data at all. However, if storage device 500 is a reused or repurposed storage device, any used partition may become pristine again, after undergoing a robust and certified data erasure, scrubbing, data-shredding procedure.

As storage for one or more tenants/domains 502a-502n is requested, storage manager 508 assigns one or more LUNs from global free storage pool 506 to an associated active storage pool 504a-504n within storage device 500. Further, when one or more of tenants/domains 502a-502n require additional storage space, storage manager 508 assigns one or more additional LUNs from global free storage pool 506 to an associated active storage pool 504a-504n. However, when one or more of tenants/domains 502a-502n no longer require the additional storage space, the unused storage space, i.e. one or more LUNs, is no longer directly returned to global free storage pool 506. Instead, storage manager 508 reassigns the unused storage space/LUNs to an associated freed space storage pool 510a-510n that is associated with the associated active storage pool 504a-504n. In reassigning the LUNs in this fashion, space freed within a given tenant's storage pool is reallocated as it is "logically clean" to other LUNs in that respective storage pool without the need to be physically erased, scrubbed, shredded, or the like.

However, since in a cloud-based storage environment each tenant may pay for the number of LUNs assigned to the tenant, the number of LUNs retained in each freed space storage pool 510a-510n may have an associated predetermined threshold. Thus, when a particular freed space storage pool exceeds its associated predetermined threshold, storage manager 508 may identify a portion of the unused storage in the associated freed space storage pool to be returned to global free storage pool 506. In accordance with the illustrative embodiments, once a particular freed space storage pool exceeds its associated predetermined threshold, storage manager 508 identifies portions of the unused storage from the particular freed space storage pool that will lower the freed space storage pool below the predetermined threshold. Storage manager 508 identifies the portion of the unused storage using one or more mechanisms to keep track of used/free space. In most cases, storage manager 508 keeps track of the used and free space by utilizing a bitmap where a respective bit represents a particular portion of the storage space as used when the bit is of one value and represents the portion of the storage space as free when the bit is of an opposite value, without regard to file type and/or data characteristics. In identifying the portion of the storage space utilizing only the bit value associated with the data, storage manager 508 is free to identify data regardless of file type, file characteristics, file sensitivity/confidentiality, or other such file level metadata. Thus, storage manager 508 identifies the portion of the unused storage based on a size of data that will lower the freed space storage pool below the predetermined threshold identified by a bit value indicating the storage space as free.

In addition to returning unused storage space when a particular freed space storage pool exceeds its associated predetermined threshold, storage manager 508 also operates to recover unused storage space when the global free storage pool 506 reaches a predefined low threshold. That is, when the global free storage pool 506 reaches a predefined low threshold, storage manager 508 scans the freed space storage pools 510a-510n for available unused storage space and migrates enough unused storage space to the global free storage pool 506. Thus, once the portion of the unused storage is identified in response to a particular freed space storage pool exceeds its associated predetermined threshold or once available unused storage space is identified from one or more freed space storage pools 510a-510n in response to the global free storage pool 506 reaching a predefined low threshold, storage manager 508 reassigns the unused storage to returned unused storage pool 512. It is only when unused storage is reassigned to returned unused storage pool 512 that recycling mechanism 514 erases, scrubs, shreds, or the like, the returned used storage data (i.e., the one or more returned LUNs). Recycling mechanism 514 may operate on a regular recycle schedule, based on one or more defined rules, or the like. The one or more defined rules may be, for example, once the global free storage pool 506 reaches a predefined low threshold, then scan the freed space storage pool 510a-510n for available space and migrate enough storage space to the global free storage pool 506 via recycling mechanism 514 to raise the storage space in the global free storage pool 506 above the predefined low threshold. Recycling mechanism 514 may return the unused storage to global free storage pool 506 overwriting the data multiple times (mostly eight times) with random data rubbish or zeros "0." Once the freed storage space has been recycled to global free storage pool 506, storage manager 508 may once again allocate one or more LUNs from global free storage pool 506 when one or more of tenants/domains 502a-502n requests additional storage.

In addition to reducing ongoing recycling of freed storage space each time unused storage is released by a tenant, another advantage of storage manager 508 reassigning the unused storage to an associated freed space storage pool is in data recovery. That is, since the unused storage is moved to an associated freed space storage pool 510a-510n and is still associated with the associated one of tenants/domains 502a-502n by LUN identification, the data recovery for any unforeseen deletion of a LUN is available from the freed space storage pool. That is, as long as the freed space storage pool is below the predetermined threshold associated with the freed space storage pool, then data may be recovered in its entirety from the freed space storage pool.

Therefore, in the illustrative embodiments, every freed storage space (freed LUN) is not returned to the global free space, but is maintained in a per tenant freed space storage pool. That way space freed by deleting one or more LUNs can be recycled between the active storage pool and the freed space storage pool without needing to "physically clean" the data. It is only when the freed space storage pool exceeds an associated predetermined threshold, that the data is moved to a returned used storage pool, cleaned by a recycling mechanism, and returned to the global free storage pool.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
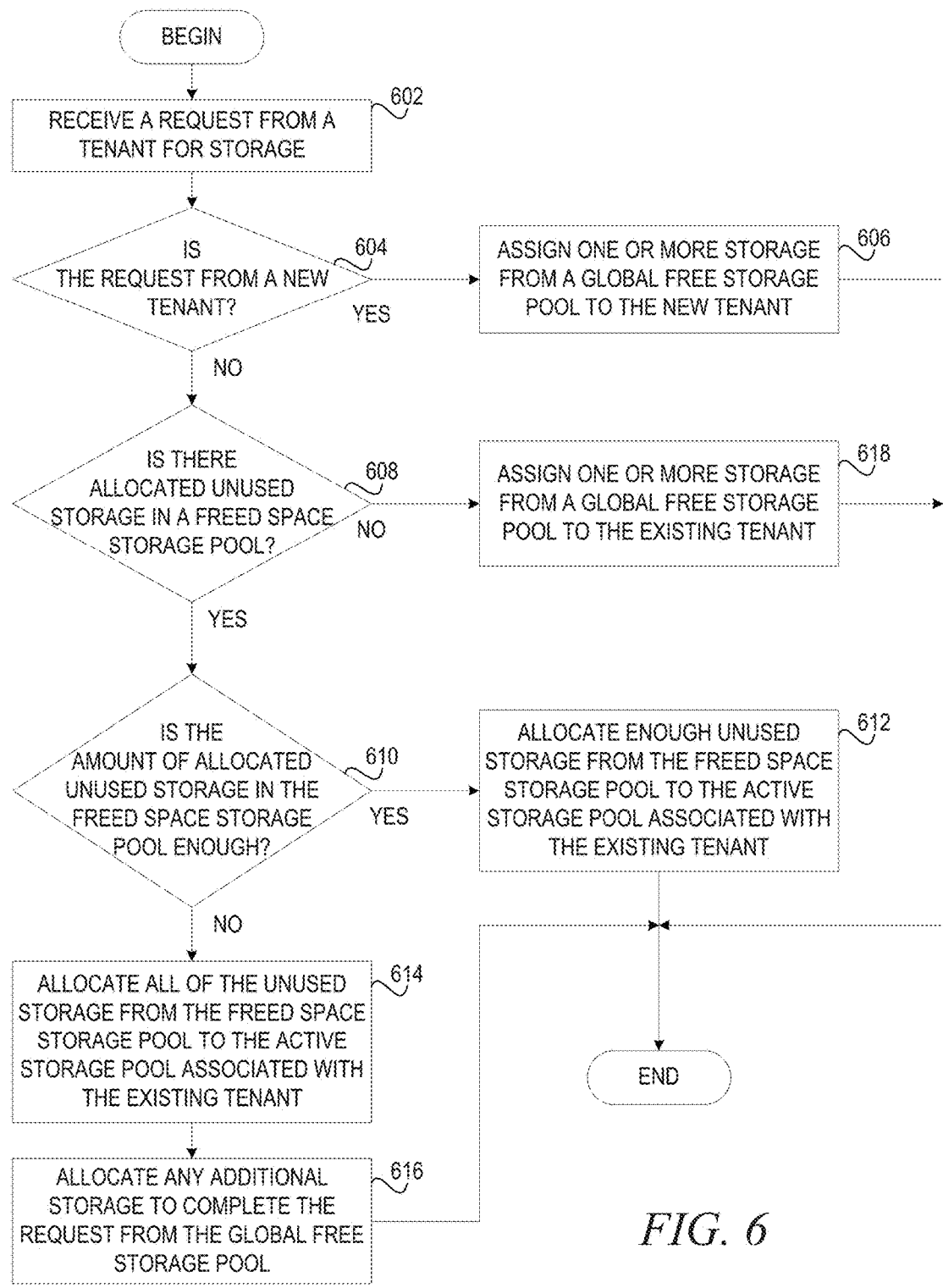
FIG. 6 depicts the operation performed by a multi-tenancy data security mechanism in allocating storage space to a tenant in accordance with an illustrative embodiment.

FIG. 6 depicts the operation performed by a multi-tenancy data security mechanism in allocating storage space to a tenant in accordance with an illustrative embodiment. As the operation begins, a storage manager in a multi-tenant data security storage system receives a request from a tenant for storage (step 602). The storage manager determines whether the request is from a new tenant (step 604). If at step 604 the storage manager determines that the request is from a new tenant, then the storage manager assigns one or more storage from a global free storage pool to the new tenant thereby creating an active storage pool associated with the new tenant (step 606), with the operation terminating thereafter. If at step 604 the storage manager determines that the request is from an existing tenant, the storage manager determines whether there is allocated unused storage in a freed space storage pool associated with an active storage pool associated with the existing tenant (step 608).

If at step 608 the storage manager determines that there is allocated unused storage in a freed space storage pool, then the storage manager determines whether the amount of allocated unused storage in the freed space storage pool is enough to satisfy the additional storage request (step 610). If at step 610 the amount of allocated unused storage in the freed space storage pool is enough to satisfy the additional storage request, then the storage manager allocates enough unused storage from the freed space storage pool to the active storage pool associated with the existing tenant (step 612), with the operation terminating thereafter. If at step 610 the amount of allocated unused storage in the freed space storage pool is not enough to satisfy the additional storage request, then the storage manager allocates all of the unused storage from the freed space storage pool to the active storage pool associated with the existing tenant (step 614) and any additional storage to complete the request from the global free storage pool (step 616), with the operation terminating thereafter. If at step 608 the storage manager determines that there is no allocated unused storage in a freed space storage pool, then the storage manager assigns one or more storage units from a global free storage pool to the existing tenant (step 618), with the operation terminating thereafter.

Figure 7:
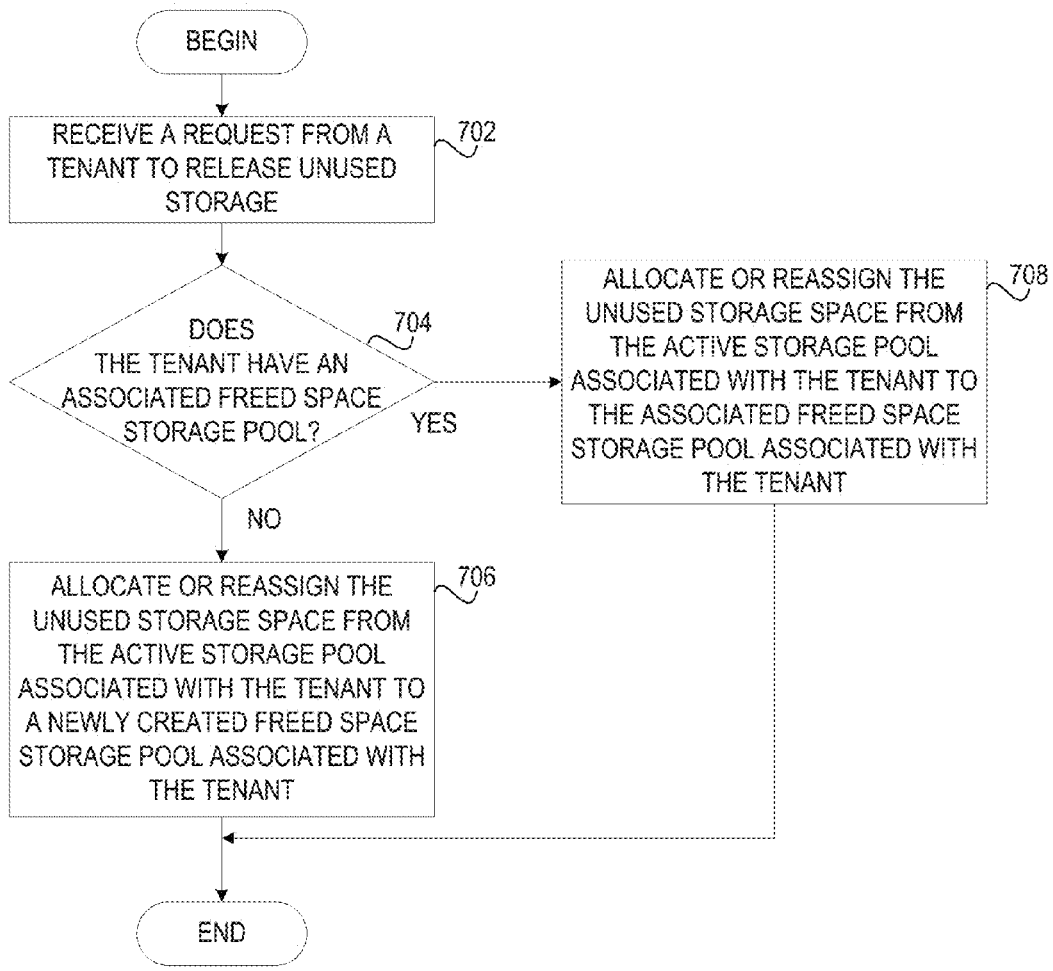
FIG. 7 depicts the operation performed by a multi-tenancy data security mechanism in handling released unused storage space from a tenant in accordance with an illustrative embodiment.

FIG. 7 depicts the operation performed by a multi-tenancy data security mechanism in handling released unused storage space from a tenant in accordance with an illustrative embodiment. As the operation begins, a storage manager in a multi-tenant data security storage system receives a request from a tenant to release unused storage (step 702). The storage manager determines whether the tenant has an associated freed space storage pool (step 704). If at step 704 the tenant fails to have an associated freed space storage pool, then the storage manager allocates or reassigns the unused storage space from the active storage pool associated with the tenant to a newly created freed space storage pool associated with the tenant (step 706), with the operation terminating thereafter. If at step 704 the tenant has an associated freed space storage pool, then the storage manager allocates or reassigns the unused storage space from the active storage pool associated with the tenant to the associated freed space storage pool associated with the tenant (step 708), with the operation terminating thereafter.

Figure 8:
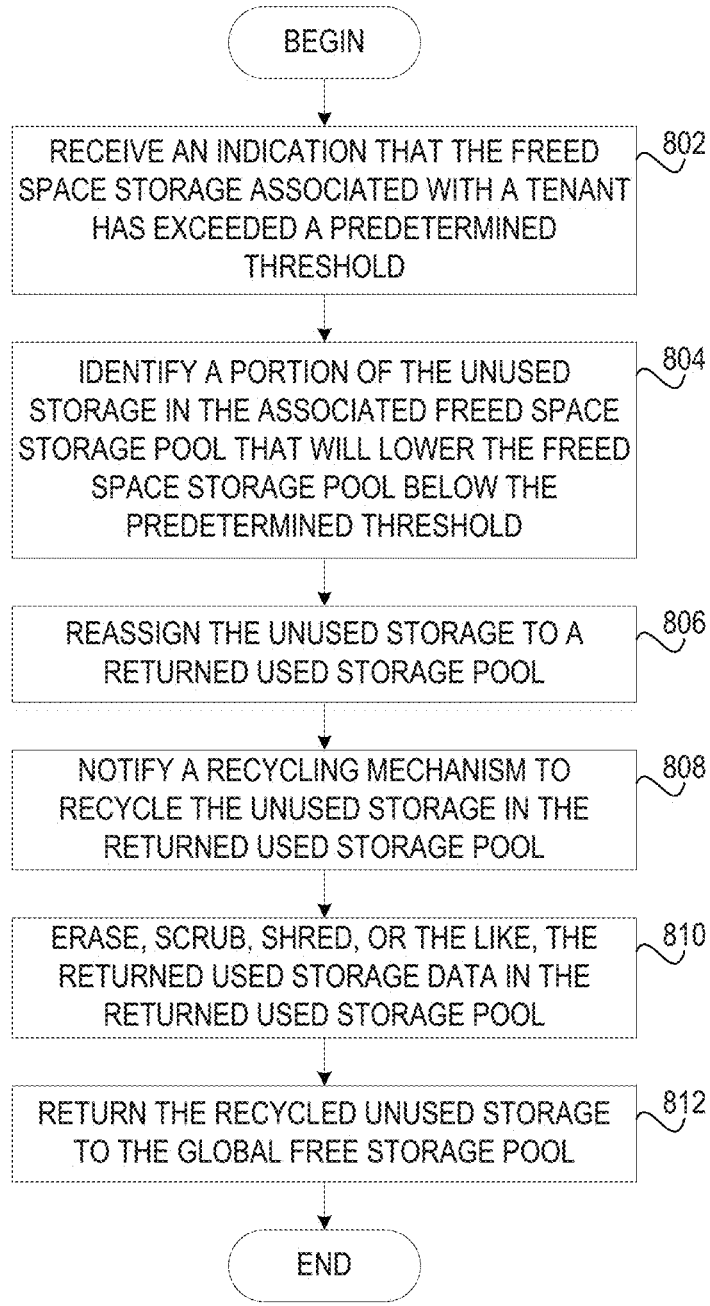
FIG. 8 depicts the operation performed by a multi-tenancy data security mechanism in handling released unused storage space from a tenant that has exceeded a predetermined threshold associated with the tenant in accordance with an illustrative embodiment.

FIG. 8 depicts the operation performed by a multi-tenancy data security mechanism in handling released unused storage space from a tenant that has exceeded a predetermined threshold associated with the tenant in accordance with an illustrative embodiment. As the operation begins, a storage manager in a multi-tenant data security storage system receives an indication that the freed space storage associated with a tenant has exceeded a predetermined threshold (step 802). The storage manager identifies a portion of the unused storage in the associated freed space storage pool that will lower the freed space storage pool below the predetermined threshold to be returned to a global free storage pool (step 804). Once the portion of the unused storage is identified, the storage manager reassigns the unused storage to a returned used storage pool (step 806) and notifies a recycling mechanism to recycle the unused storage in the returned used storage pool (step 808). The recycling mechanism then erases, scrubs, shreds, or the like, the returned used storage data in the returned used storage pool (step 810) and returns the recycled unused storage to the global free storage pool (step 812), with the operation terminating thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perfornm the specified functions or acts or carry out combinations of special purpose hardware and computer instructions.

Thus, the illustrative embodiments provide mechanisms for segregating data so that each tenant may use their own portion of the storage device, while that portion of the storage device cannot be shared with others while retaining the GRID design points. Therefore, in the illustrative embodiments, every freed storage space (freed LUN) is not returned to the global free space, but is maintained in a per tenant freed space storage pool. That way space freed by deleted of one or more LUNs can be recycled between the active storage pool and the freed space storage pool without needing to "physically clean" the data. It is only when the freed space storage pool exceeds an associated predetermined threshold, that the data is moved to a returned used storage pool, cleaned by a recycling mechanism, and returned to the global free storage pool.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for multi-tenancy data security, the method comprising:
   receiving, in a storage device, a request for storage from a client device;
   responsive to the request for storage being from an existing tenant, determining, by the storage device, whether there is allocated unused storage in a freed space storage pool associated with the existing tenant;
   responsive to the allocated unused storage existing in the freed space storage pool, re-allocating, by the storage device, all or a portion of the allocated unused storage existing in the freed space storage pool to an active storage pool associated with the existing tenant in order to satisfy the request such that the client device accesses the allocated unused storage in the active storage pool;
   responsive to the freed space storage pool exceeding a predetermined threshold, identifying, by the storage device, a portion of unused storage in the freed space storage pool that will lower the freed space storage pool below the predetermined threshold;
   reassigning, by the storage device, the identified unused storage in the freed space storage pool to a returned used storage pool;
   recycling, by the storage device, the identified unused storage in the returned used storage pool; and
   returning, by the storage device, the recycled unused storage to the global free storage pool.

2. The method of claim 1, further comprising:
   responsive to the reallocation of all of the allocated unused storage existing in the freed space storage pool to the active storage pool associated with the existing tenant failing to complete the request for storage, allocating, by the storage device, additional storage from a global free storage pool.

3. The method of claim 1, wherein re-allocating all or the portion of the allocated unused storage existing in the freed space storage pool to the active storage pool is performed utilizing a bit/nap where a respective bit that represents the portion of the allocated unused storage in the freed space storage pool is changed from a first value to a second value in order that the allocated unused storage is active storage in the active storage pool.

4. The method of claim 1, further comprising:
   responsive to the request for storage being from a new tenant, allocating, by the storage device, storage from a global free storage pool.

5. The method of claim 1, further comprising:
   responsive to receiving a request to release the allocated unused storage space from the active storage pool associated with the existing tenant, re-allocating, by the storage device, the allocated unused storage space from the active storage pool associated with the existing tenant to the freed space storage pool associated with the existing tenant.

6. The method of claim 1, wherein recycling the identified unused storage in the returned used storage pool comprises one or more of erasing, scrubbing, or shredding data of the identified unused storage.

7. A computer program product comprising a non-transitory computer readable storage medium having a computer readable program stored therein, wherein the computer readable program, when executed on a computing device, causes the computing device to:
receive a request for storage from a client device;
responsive to the request for storage being from an existing tenant, determine whether there is allocated unused storage in a freed space storage pool associated with the existing tenant;
responsive to the allocated unused storage existing in the freed space storage pool, re-allocate all or a portion of the allocated unused storage existing in the freed space storage pool to an active storage pool associated with the existing tenant in order to satisfy the request such that the client device accesses the allocated unused storage in the active storage pool;
responsive to the freed space storage pool exceeding a predetermined threshold, identify a portion of unused storage in the freed space storage pool that will lower the freed space storage pool below the predetermined threshold;
reassign the identified unused storage in the freed space storage pool to a returned used storage pool;
recycle the identified unused storage in the returned used storage pool; and
return the recycled unused storage to the global free storage pool.

8. The computer program product of claim 7, wherein the computer readable program further causes the computing device to:
responsive to the reallocation of all of the allocated unused storage existing in the freed space storage pool to the active storage pool associated with the existing tenant failing to complete the request for storage, allocate additional storage from a global free storage pool.

9. The computer program product of claim 7, wherein re-allocating all or the portion of the allocated unused storage existing in the freed space storage pool to the active storage pool is performed utilizing a bitmap where a respective bit that represents the portion of the allocated unused storage in the freed space storage pool is changed from a first value to a second value in order that the allocated unused storage is active storage in the active storage pool.

10. The computer program product of claim 7, wherein the computer readable program further causes the computing device to:
responsive to the request for storage being from a new tenant, allocate storage from a global free storage pool.

11. The computer program product of claim 7, wherein the computer readable program further causes the computing device to:
responsive to receiving a request to release the allocated unused storage space from the active storage pool associated with the existing tenant, re-allocate the allocated unused storage space from the active storage pool associated with the existing tenant to the freed space storage pool associated with the existing tenant.

12. The computer program product of claim 7, wherein recycling the identified unused storage in the returned used storage pool comprises one or more of erasing, scrubbing, or shredding data of the identified unused storage.

13. An apparatus comprising:
a processor; and
a memory coupled to the processor, wherein the memory comprises instructions which, when executed by the processor, cause the processor to:
receive a request for storage from a client device;
responsive to the request for storage being from an existing tenant, determine whether there is allocated unused storage in a freed space storage pool associated with the existing tenant;
responsive to the allocated unused storage existing in the freed space storage pool, re-allocate all or a portion of the allocated unused storage existing in the freed space storage pool to an active storage pool associated with the existing tenant in order to satisfy the request such that the client device accesses the allocated unused storage in the active storage pool;
responsive to the freed space storage pool exceeding a predetermined threshold, identify a portion of unused storage in the freed space storage pool that will lower the freed space storage pool below the predetermined threshold;
reassign the identified unused storage in the freed space storage pool to a returned used storage pool;
recycle the identified unused storage in the returned used storage pool; and
return the recycled unused storage to the global free storage pool.

14. The apparatus of claim 13, wherein the instructions further cause the processor to:
responsive to the reallocation of all of the allocated unused storage existing in the freed space storage pool to the active storage pool associated with the existing tenant failing to complete the request for storage, allocate additional storage from a global free storage pool.

15. The apparatus of claim 13, wherein re-allocating all or the portion of the allocated unused storage existing in the freed space storage pool to the active storage pool is performed utilizing a bitmap where a respective bit that represents the portion of the allocated unused storage in the freed space storage pool is changed from a first value to a second value in order that the allocated unused storage is active storage in the active storage pool.

16. The apparatus of claim 13, wherein the instructions further cause the processor to:
responsive to the request for storage being from a new tenant, allocate storage from a global free storage pool.

17. The apparatus of claim 13, wherein the instructions further cause the processor to:
responsive to receiving a request to release the allocated unused storage space from the active storage pool associated with the existing tenant, re-allocate the allocated unused storage space from the active storage pool associated with the existing tenant to the freed space storage pool associated with the existing tenant.

18. The apparatus of claim 13, wherein recycling the identified unused storage in the returned used storage pool comprises one or more of erasing, scrubbing, or shredding data of the identified unused storage.

* * * * *